May 12, 1925.
E. E. GRAVES
1,537,231
TIRE TRACTION AND NONSKID CHAIN LUG
Filed April 17, 1923
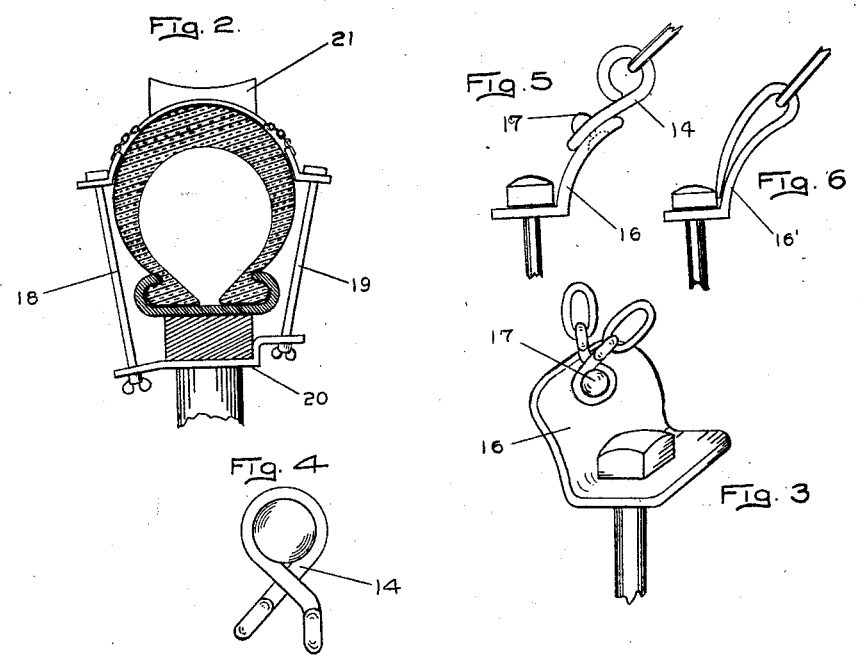
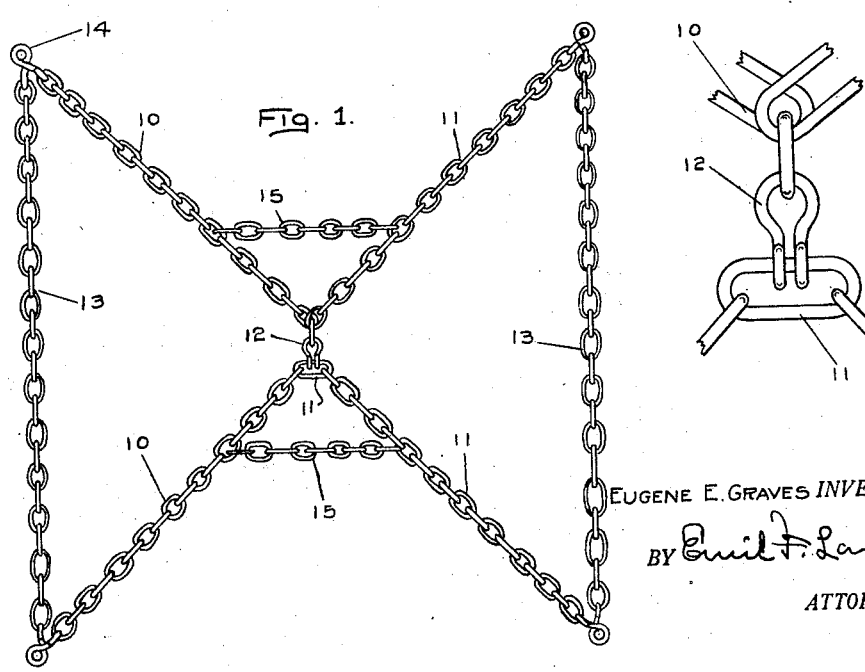
Eugene E. Graves INVENTOR.
BY
ATTORNEY Patented May 12, 1925.

1,537,231

UNITED STATES PATENT OFFICE.

EUGENE E. GRAVES, OF LINCOLN, NEBRASKA.

TIRE TRACTION AND NONSKID CHAIN LUG.

Application filed April 17, 1923. Serial No. 632,785.

*To all whom it may concern:*

Be it known that I, EUGENE E. GRAVES, a citizen of the United States, residing at Lincoln, in the county of Lancaster and State of Nebraska, have invented certain new and useful Improvements in Tire Traction and Nonskid Chain Lugs, of which the following is a specification.

My invention relates to tire chains and lugs having both a traction and a nonskid function.

The chains at present on the market are exceedingly difficult to secure on the tire. The usual practice with most chains of this kind is to lay the pair of chains in parallel relation in the mud behind the rear wheels of the automobile, then to back the automobile onto the chains, and finally to lift the ends of each chain and to unite the ends. These steps are a great deal more difficult than they appear, especially if the mud is deep in the road or if the wheels have collected much mud, and it is evident that gloves must be worn to prevent soiling of the hands.

It has been thought that the use of mud lugs in the place of chains would solve the difficulties which were encountered with chains. The mud lugs of course furnish ample traction and they have been developed to a point where they can be easily attached to and removed from the tire. This is true particularly of the type of fastening device employed in connection with the mud lug shown in the patent to Abbott and Sands, #1441198, January 9, 1923. I have however found several minor objections which appear occasionally in the use of all mud lugs. After a light rain on the dry, hard-packed road, the lug cannot secure sufficient footing to avoid the "bumping," and yet the surface of the road may be so slippery that travel on the bare tires is impossible. Then too, when slippery and hard spots alternate with frequent recurrence, the tendency of the driver is to leave the lugs in place on the wheels in spite of the rough riding over the hard spots. The lug is of course an emergency proposition and is adapted only for extricating a mired automobile and for preventing the miring of the automobile, but many situations arise which require a less degree of traction than that afforded by the lug. At the same time it is desirable that the device be equipped with nonskid as well as traction features, since a slippery surface road causes both skidding and loss of power through loss of traction.

The object of my invention is the provision of a chain which will resist both the sidewise and the lengthwise slippage of the tire on a slippery surface, and which can be quickly attached to or removed from the tire. I have also designed a lug for use in connection with the chain, the cutting edge of which lug functions on the same principle as but to a greater degree than the chain.

Referring now to the drawings which are part of my aplication, and in which like numerals refer to like parts in the description, Figure 1 is a plan view of my chain when spread out and without the lug or any of the attaching means.

Figure 2 is a transverse sectional view of the tire and felly, showing the chain, lug, and fastening devices.

Figures 3, 4, and 5 are fragmentary views showing the type of connection which I employ at each of the four corners of my chain structure.

Figure 6 is a view similar to Figure 5 and showing a modification of the same structure.

Figure 7 is a fragmentary view of the connections at the center of my chain structure.

The chain which I show in my drawings is intended merely to show the relationships of the various chain parts to each other and to the securing means which I employ, but it does not show the only type of chain which I may use with my connections, and I reserve to myself the right to use any type of chain which is suitable for the purposes of a tire chain.

The main portion of the chain structure is made up of two lengths of chain 10 and 11, each bent at its middle point into V-shape. The apexes of the two chain lengths 10 and 11 are connected as shown in Figure 7. The hook 12 is a stock article obtainable at most garages and hardware stores, being made by bending a heavy wire or a light rod so as to form an eye portion with two hooked extremities. In making the center connection I secure the middle link of the chain 10 into the eye portion of the hook 12 and then catch the hooked extremities of the hook 12 through the middle link of the chain 11, after which I bend down the hooked extremities with a blow from a hammer or otherwise. In order to avoid undue chafing of rough ends on the tire, I position the hook 12 in such a way that the extremities will be on the outer side of the chain structure.

The ends of each of the chains 10 and 11 are connected by means of chains 13 which pass transversely over and rest on the tire when the chain structure is in place. The corner connections are made by means of hooks 14, which are similar to the hooks 12 but which are modified to serve this purpose. As shown the hooked end portions of the original hook are crossed by bending in a vise or otherwise to completely encircle the eye. At each corner of the chain structure the meeting ends of the chains are connected by securing them to the respective hooked ends of the hook 14. The chain structure is completed by the addition of two short lengths of nonskid chain 15. These chains 15 may be secured at their ends directly to the links of the chains 10 and 11 as shown, or they may be so secured by means of hooks similar to hooks 12, or in any other desired manner.

To each of the four corners of the chain structure I secure an angle plate 16, as shown in Figures 2, 3, and 5, and in modified form in Figure 6. The plate 16 has a portion which is more or less horizontal and an upstanding curved portion, the curvature being substantially that of the average tire. I provide the curved portion of the plate 16 with an aperture which is countersunk as shown in dotted lines in Figure 5, and in assembling the structure I pass a rivet 17 or other suitable fastening device through the eye of the hook 14 and through the aperture in the curved portion of the plate. The head of the rivet must of course be sufficiently large to prevent the displacement of the hook 14. The rivet is flattened in the countersunk portion of the aperture so as to avoid chafing the tire. I may however modify this arrangement as shown in Figure 6, by providing the plate 16' with a curved tongue to form a loop for directly engaging the chain structure at its corner.

For securing the chain structure to the tire, I employ the fastening means of the hereinbefore mentioned patent granted to Abbott and Sands. The horizontal portion of each angle plate 16 has an aperture for the reception of a bolt 18 or 19. The plate 20 is adapted to bear against the inner side of the felly and has two angular end portions which are each provided with bolt holes. The bolt 19 is on the outer side of the wheel while the bolt 18 is on the inner side. The fastening means and the method of using it is fully described in the patent referred to, thus making further description unnecessary at this time. It should however be said that I so proportion the chain parts that the two plates 20 which I use with each of my chain structures bear against consecutive spokes of the wheel to prevent any displacement of the various parts.

It sometimes occurs that the roads are in such condition that the chain alone will not give sufficient traction. In such cases I add to the equipment a lug 21, which may be used alone or in conjunction with the chain. The distinguishing feature of my lug is the concaved edge. This affords two teeth one at each end of the digging edge, and a considerable amount of traction surface between the teeth. The outer edges of the lug to a considerable degree resist the tendency of the wheel to slip laterally and thus add materially to the nonskid advantages of the chain. This form of lug will be found to possess marked advantages wherever a lug will function, but it is particularly useful on roads which are covered with ice or packed snow. The impact of the lug will on even the hardest ice, drive the two teeth into the ice and will prevent slippage in any direction. The lug 21 may be secured in any desired manner. It is preferably constructed with a base portion which fits the contour of the tire, the base portion being provided with means for detachable connection with the chains 15. The base portion may rest either directly on the surface of the tire or on the outer surface of the chain structure.

My chain structures function best when used in multiples on each rear wheel. Because of the securing means which I use, they are attachable and detachable, requiring little more than a twist of the wrist for either operation. It is not necessary as with the older types of chains to stand in the muddy road to put the chain into place, as the entire operation can be performed from a position on the running board of the automobile. The chains 13 are primarily traction chains while the chains 15 serve chiefly as nonskid chains, but in both cases the chains themselves in their links will resist to a certain extent every tendency of the wheel to slip. The chains 10 and 11 however pass diagonally over the tire and thus their position enables them to function both as traction chains and as nonskid chains.

Having thus described my invention in terms which will be readily understood by others skilled in the art to which it pertains, what I believe to be new and desire to secure by Letters Patent of the United States is:—

1. In a tire chain structure, a pair of crossed chains adapted to rest diagonally on the surface of the tire, a transverse chain connecting the forward extremities of the crossed chains and a second transverse chain connecting the rearward extremities of the crossed chains, said transverse chains serving primarily as traction chains, and other chains connecting said first named chains intermediate their ends so as to lie longitudinally on the surface of the tire to serve primarily as nonskid chains.

2. In a tire chain structure, a pair of crossed chains adapted to rest diagonally on the surface of the tire, a chain spanning the distance between the forward ends of said crossed chains, a chain spanning the distance between the rearward ends of said crossed chains, and corner connections for the chain structure, each of said corner connections being bent at its middle point with the two arms crossing to form a completely enclosed eye, and hooked ends on the two arms for engaging the respective end links of the abutting chains.

3. Means for securing a chain structure to a wheel and tire, said means including plates on the inner and outer sides of said chain structure, said plates being each angled and having a curved upstanding portion adapted to rest against the tire and a substantially horizontal portion, said curved upstanding portion having an aperture which is countersunk on the inner side of the plate, said aperture being adapted for the reception of a rivet for pivotally securing a chain portion to said plate, an aperture in the horizontal portion of the plate a bolt passing through said aperture, and means bearing against the felly on its inner side and connecting the inner extremities of the bolts passing through the apertures of said plates on the inner and outer sides of the chain structure.

In testimony whereof I affix my signature.

EUGENE E. GRAVES.